PERRIN & RUDDUCK.
Seed-Planter.

No. 10,037. Patented Sept. 20, 1853.

UNITED STATES PATENT OFFICE.

HENRY PERRIN AND WILLIAM RUDDUCK, OF WILMINGTON, OHIO.

IMPROVEMENT IN SEED-PLANTERS.

Specification forming part of Letters Patent No. 10,037, dated September 20, 1853.

*To all whom it may concern:*

Be it known that we, HENRY PERRIN and WILLIAM RUDDUCK, of Wilmington, in the county of Clinton and State of Ohio, have invented certain new and useful Improvements in Seed-Planters, of which the following is a full, clear, and exact description, reference being had to the accompanying drawings, which form part of this specification, and in which—

Figure 1:
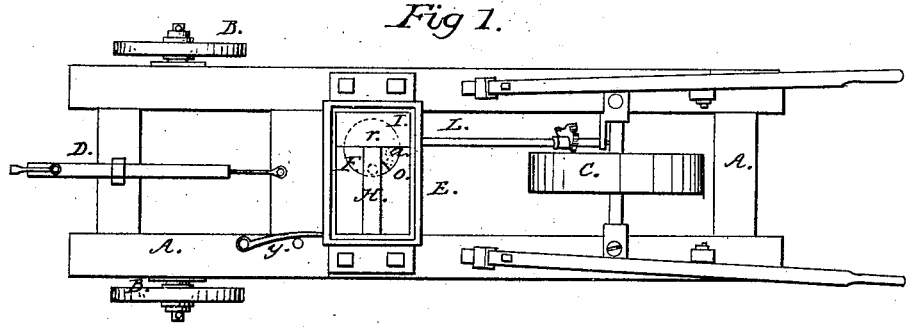
Figure 2:
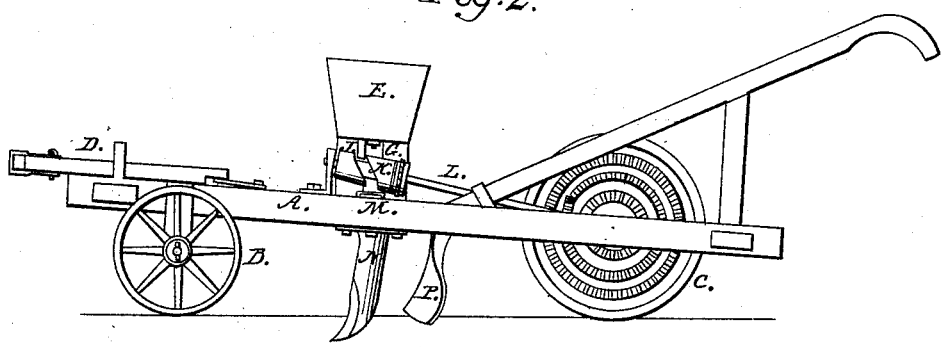
Figure 3:
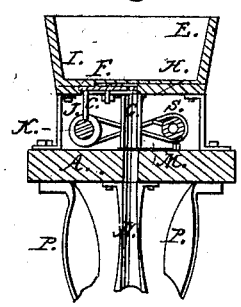
Figure 4:
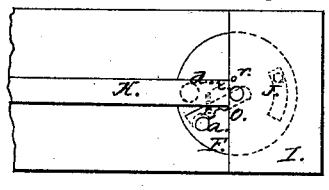
Figure 5:
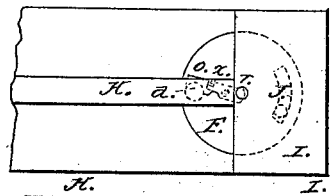
Figure 6:
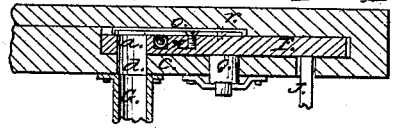

Figure 1 represents a plan; Fig. 2, a side elevation; Fig. 3, a transverse section taken centrally through the hopper; Fig. 4, a plan of the distributing apparatus detached and in the proper position for receiving the seed; Fig. 5, a similar view of the same in the proper position for delivering the seed; and Fig. 6, a longitudinal vertical section thereof, the three last views being on an enlarged scale for the better illustration of the parts.

In planting corn and other like grain and seed it is desirable for the proper growth of the plant that the seed should be distributed in hills formed of an equal number of kernels, and situated at regular distances apart. This heretofore has been difficult to attain, owing to the varying sizes of the kernels; and the several seed-planters hitherto in use have all been defective in their seed-distributing apparatus, which have either at times permitted too profuse an escape of the smaller seed or otherwise cramped the discharge of the larger kind, and have been more or less liable to clog at the discharge-aperture. To effect in a simple and effectual manner uniformity in planting, and to prevent the clogging of the seed from obstructing the discharge, and otherwise to improve the distributing mechanism of seed-planters, is the object of our invention.

The machine represented in the accompanying drawings is constructed for planting in single rows; but the contrivances illustrated may be multiplied for planting in two, three, or more rows simultaneously.

The frame A of the planter is mounted on front running-wheels, B, and an after running and driving wheel, C. The latter effects the discharge of the seed from the hopper as it rotates with the forward movement of the planter, which may be drawn by a horse hitched to the draft-bar D. The seed box or hopper E is provided at its bottom with an oscillating disk-valve, F, turning on a central pivot, Q, perforated with an aperture, $a$, to receive seeds or kernels in it. This aperture is calculated to receive but one grain or kernel at a time of corn or other large seeds. The upper face of this valve is level, or thereabout, with the bottom of the hopper, while its lower face rests upon and moves against or over an underplate, $c$, which has an aperture, $d$, through it to permit the seed to drop into a receiving-tube, G, as the valve vibrates horizontally over it. A horizontal cap, H, extends along the bottom of the hopper and over a portion of the valve, which may be also partially covered by a cap or piece, I, that will serve to relieve it of the weight of the seed in the hopper. The horizontal vibratory motion is communicated to the valve by means of a pin or shank, J, which projects through a slot in the lower plate or seat of the valve, and is worked to and fro by the rotary movement of an endless groove, which runs obliquely round a cylinder, K, into which the stem J extends, and which causes the valve to vibrate one-third of a circle (more or less) in order that the perforation $a$ may be alternately brought into the hopper for the reception of the seed and under the cap H to discharge it into the receiving-tube G. The cam K is rotated by means of a shaft, L, that derives its motion by a pinion gearing into either one of a series of bevel-wheels connected with the driving-wheel C, according to the relative velocity of discharge required. In addition to the operation of the cam the shaft L also carries a pulley, which turns through a cross-band a second cam, S, that actuates at intervals a slide-valve, M, to permit the discharge of the seed accumulated in the receiving-tube G into the depositing tube or tooth N, and which is again thrown back to its former position by a spring, Y. A plate, $o$, is pivoted on the upper surface of the valve F in such manner that it is free to oscillate within certain limits, and is constantly pressed toward one extreme of its range of oscillation by a spring, $x$, placed beneath it in a recess in the top of the valve. When at this extreme of its range of oscillation the plate slightly overlaps the edge of the perforation or seed-cup $a$, thus contracting the entrance to the same, so that any seed or other substance that can enter this contracted aperture, even though it be with difficulty, will meet with abundant room to pass freely through the lower part of the aperture. When the valve is so turned as to bring the aperture *a* over the tube G the inner arm of the plate *o* is borne against a pin, *r*, that projects down from the cap H, so as to turn it to the extreme of its oscillation opposite that to which the spring *x* presses it, and this withdraws it back from the seed-cup *a*, so that anything which has entered the cup and may happen to be bound by the plate *o* will be released, and thus the obstruction or clogging of the seed-cup is effectually guarded against. As the perforation in the disk admits but one kernel at a time, a number of grains will be discharged into the receiving-tube corresponding to the number of its vibrations during the intervals at which the valve opens, and consequently, upon the opening of the lower valve, a uniform quantity of seed will be delivered into the depositing tube or tooth. The lower end of the distributing-tube is formed into a share, and makes the furrow in which to deposit the seed, and following shares P turn the earth back into the furrow to cover the seed.

Having thus described our improvements in seed-planters, what we claim as new, and desire to secure by Letters Patent, is—

The method of supplying the distributing-tube with grain or seed from the hopper by means of the reciprocating or vibratory valve F in the hopper, in combination with the cap H, and the discharging-plate O, and receiving-chamber G, constructed, arranged, and operating as described.

In testimony whereof we have hereunto subscribed our names.

HENRY PERRIN.
WILLIAM RUDDUCK.

Witnesses:
I. S. WRIGHT,
A. T. SEWELL.